(12) United States Patent
Yamashita et al.

(10) Patent No.: US 8,708,125 B2
(45) Date of Patent: Apr. 29, 2014

(54) CLUTCH AND MOTOR

(75) Inventors: Tomoki Yamashita, Hamamatsu (JP); Hiroshi Kokubu, Kosai (JP)

(73) Assignee: Asmo Co., Ltd. (JP)

( * ) Notice: Subject to any disclaimer, the term of this patent is extended or adjusted under 35 U.S.C. 154(b) by 169 days.

(21) Appl. No.: 13/232,750

(22) Filed: Sep. 14, 2011

(65) Prior Publication Data
US 2012/0061200 A1    Mar. 15, 2012

(30) Foreign Application Priority Data

Sep. 15, 2010 (JP) ................................ 2010-206720
Aug. 4, 2011 (JP) ................................ 2011-171163

(51) Int. Cl.
*F16D 43/02* (2006.01)
*H02K 7/102* (2006.01)

(52) U.S. Cl.
USPC ........................................ 192/223.2; 310/77

(58) Field of Classification Search
USPC ..................................................... 192/223.2
See application file for complete search history.

(56) References Cited

U.S. PATENT DOCUMENTS

| | | | |
|---|---|---|---|
| 6,481,550 B2 * | 11/2002 | Yamamoto et al. | 310/78 |
| 6,575,277 B1 | 6/2003 | Torii et al. | |
| 6,641,215 B2 * | 11/2003 | Rohee | 192/223.2 |
| 2001/0010280 A1 | 8/2001 | Torii et al. | |
| 2002/0011390 A1 | 1/2002 | Yamamoto et al. | |
| 2002/0195859 A1 | 12/2002 | Rohee | |
| 2007/0188032 A1 * | 8/2007 | Toyoda et al. | 310/75 R |

FOREIGN PATENT DOCUMENTS

| | | |
|---|---|---|
| CN | 1310788 A | 8/2001 |
| JP | 2002-39223 A | 2/2002 |
| JP | 2007-100846 A | 4/2007 |

OTHER PUBLICATIONS

Chinese Application Serial No. 201110288788.7, Office Action mailed Oct. 22, 2013, (w/ English Translation), 14 pgs.

* cited by examiner

*Primary Examiner* — Rodney Bonck
(74) *Attorney, Agent, or Firm* — Schwegman, Lundberg & Woessner, P.A.

(57) ABSTRACT

A clutch is provided that includes an annular clutch housing, a driving-side rotor, a driven-side rotor having a control surface, and a rolling element located between the inner circumferential surface of the clutch housing and the control surface. The control surface faces radially outward in the clutch housing. When the driving-side rotor rotates, the rotational driving force of the driving-side rotor is transmitted to the driven-side rotor. When the driving-side rotor is driven to rotate, the rolling element rotates together with the driven-side rotor. When the driving-side rotor is not driven to rotate, the rolling element is held between the inner circumferential surface of the clutch housing and the control surface so as to prevent the driven-side rotor from rotating.

16 Claims, 10 Drawing Sheets

CLUTCH AND MOTOR

RELATED APPLICATIONS

This application claims the benefit of priority under 35 U.S.C. Section 119, to Japanese Patent Application Serial No. 2010-206720, filed on Sep. 15, 2010; and Japanese Patent Application Serial No. 2011-171163, filed on Aug. 4, 2011, which applications are incorporated herein by reference in their entirety.

BACKGROUND OF THE INVENTION

The present invention relates to a clutch that transmits rotational driving force from a drive shaft to a driven shaft and does not transmit rotational force from the driven shaft to the drive shaft, and to a motor equipped with such a clutch.

In general, a motor used as a drive source for a power window apparatus or the like includes a rotary shaft, which is driven to rotate, and a speed reducing mechanism coupled to the rotary shaft via a clutch. The clutch operates to transmit rotational driving force from the rotary shaft to a worm shaft of the speed reducing mechanism and not to transmit rotational force from the worm shaft to the rotary shaft.

For example, Japanese Laid-Open Patent Publication No. 2002-39223 discloses a motor with a clutch having an annular clutch housing. The clutch housing accommodates a driving-side rotor, which rotates integrally with the rotary shaft, a driven-side rotor, which rotates integrally with the worm shaft, and rolling elements. The driven-side rotor includes a shaft portion and engaging projections extending radially outward from the shaft portion. A control surface is formed on the radially outer end face of each engaging projection. The distance between the control surface and the clutch housing varies along the rotational direction. The rolling elements are each located between the clutch housing and one of the control surfaces. When the driving-side rotor is driven to rotate by the rotary shaft, the driving-side rotor is engaged with the engaging projections of the driven-side rotor with respect to the circumferential direction. Accordingly, the rotational driving force from the rotary shaft is transmitted to the worm shaft via the driving-side rotor and the driven-side rotor. On the other hand, when the rotary shaft is not driven to rotate, the rolling elements are held between the control surfaces of the engaging projections and the clutch housing, thereby inhibiting rotation of the driven-side rotor. Rotational force of the worm shaft is thus not transmitted to the rotary shaft.

According to the clutch disclosed in Japanese Laid-Open Patent Publication No. 2002-39223, the engaging projections project radially outward from the shaft portion, and are engaged with the driving-side rotor when the rotary shaft is driven to rotate. When the rotary shaft is not driven to rotate, the engaging projections hold, together with the clutch housing, the rolling elements. However, the engaging projections, which project radially outward, increase the radial size of the clutch.

SUMMARY OF THE INVENTION

Accordingly, it is an objective of the present invention to provide a clutch capable of reducing its radial size and a motor having the clutch.

To achieve the foregoing objective and in accordance with one aspect of the present invention, a clutch is provided that includes an annular clutch housing, a driving-side rotor, a driven-side rotor having a control surface, and a rolling element located between the inner circumferential surface of the clutch housing and the control surface. The control surface faces radially outward in the clutch housing. When the driving-side rotor rotates, the rotational driving force of the driving-side rotor is transmitted to the driven-side rotor. When the driving-side rotor is driven to rotate, the rolling element rotates together with the driven-side rotor. When the driving-side rotor is not driven to rotate, the rolling element is held between the inner circumferential surface of the clutch housing and the control surface so as to prevent the driven-side rotor from rotating. The driven-side rotor includes a driven-side coupling portion that can be coupled to and integrally rotatable with the driving-side rotor. The driven-side coupling portion and the control surface are provided at different positions in the axial direction.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS (First Embodiment)

A first embodiment of the present invention will now be described with reference to the drawings.

Figure 1:
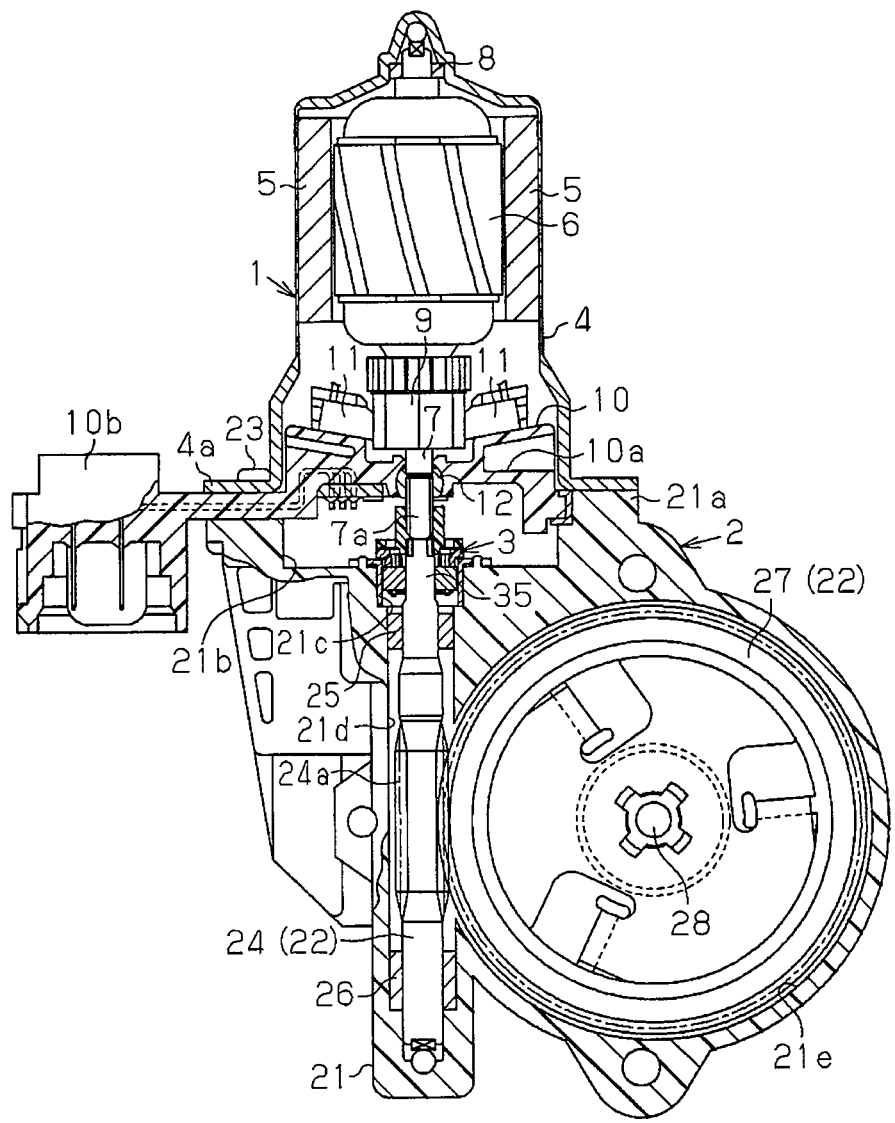
FIG. 1 is a cross-sectional view illustrating a motor according to a first embodiment of the present invention.

FIG. 1 shows a motor according to the present embodiment. The motor is used as a drive source for a power window apparatus. The motor includes a motor section 1, a speed reducing section 2, and a clutch 3.

The motor section 1 has a cylindrical yoke housing (hereinafter, simply referred to as a yoke) 4 with a bottom. Magnets 5 are secured to the inner circumferential surface of the yoke 4 to face each other. An armature 6 is provided inside the magnets 5. The armature 6 has a rotary shaft 7 (drive shaft) arranged at the center of the yoke 4. The proximal end of the rotary shaft 7 (the upper end as viewed in FIG. 1) is supported by a bearing 8 provided at the center of the bottom of the yoke 4. A cylindrical commutator 9 is fixed to a distal portion of the rotary shaft 7. A coupling portion 7a is provided at the distal portion of the rotary shaft 7. The coupling portion 7a is formed by forming parallel flat surfaces on a columnar body. The distal end of the coupling portion 7a is formed as a curved surface (a part of a sphere).

The yoke 4 has an open end with an opening, and a flange portion 4a extending radially outward is formed at the open end. A brush holder 10 is fitted to the opening of the yoke 4. The brush holder 10 is formed by integrally forming a holder body 10a and a connector portion 10b. The holder body 10a is shaped to close the opening of the yoke 4, and the connector portion 10b projects radially outward of the yoke 4. The holder body 10a holds a pair of brushes 11. The brushes 11 slide on the commutator 9 and are connected to the connector portion 10b via wires (not shown). A bearing 12 is provided at the center of the holder body 10a. The bearing 12 supports a section of the rotary shaft 7 between the commutator 9 and the coupling portion 7a. Power supplied to the brushes 11 from an external power source via the connector portion 10b is supplied to the armature 6 via the commutator 9. Accordingly, the armature 6 (the rotary shaft 7) is driven to rotate, that is, the motor section 1 is driven to rotate.

The speed reducing section 2 includes a resin gear housing 21 and a speed reducing mechanism 22 accommodated in the gear housing 21. The gear housing 21 has a fixing portion 21a for fixing the gear housing 21 to the motor section 1. The fixing portion 21a is located at a position that faces the motor section 1 in the axial direction (the upper end as viewed in FIG. 1). The fixing portion 21a has a similar outer shape as that of the flange portion 4a of the yoke 4, and a fitting recess 21b, which opens toward the yoke 4, is formed in the fixing portion 21a. With the holder body 10a of the brush holder 10 fitted in the fitting recess 21b, the fixing portion 21a and the flange portion 4a contacting the fixing portion 21a are fixed a screw 23. This fixes the yoke 4 to the gear housing 21, so that the motor section 1 and the speed reducing section 2 are integrated.

A clutch accommodating recess 21c is formed at the center of the bottom of the fitting recess 21b. A worm shaft accommodating portion 21d is formed at the center of the bottom of the clutch accommodating recess 21c to extend along the axial direction of the rotary shaft 7. A wheel accommodating portion 21e is formed on a side (right side as viewed in FIG. 1) of the worm shaft accommodating portion 21d. The wheel accommodating portion 21e is connected to the worm shaft accommodating portion 21d at a center in the axial direction (longitudinal direction) of the worm shaft accommodating portion 21d.

A substantially columnar worm shaft 24 is accommodated in the worm shaft accommodating portion 21d. The worm shaft 24 is made of metal and has a screw gear-like worm portion 24a at a center in the axial direction. Metal cylindrical bearings 25, 26 are provided at axial ends of the worm shaft accommodating portion 21d. The axial ends of the worm shaft 24 are supported by the bearings 25, 26. Accordingly, the worm shaft 24 is arranged to be coaxial with the rotary shaft 7. That is, the central axis L1 of the rotary shaft 7 and the central axis L2 of the worm shaft 24 are arranged on the same straight line (refer to FIG. 2).

A disk-like worm wheel 27 is rotatably accommodated in the wheel accommodating portion 21e. The worm wheel 27 meshes with the worm portion 24a of the worm shaft 24, and forms the speed reducing mechanism 22 together with the worm shaft 24. An output shaft 28 is provided at a radial center of the worm wheel 27. The output shaft 28 extends along the axial direction (direction perpendicular to the sheet of FIG. 1) of the worm wheel 27 and rotates integrally with the worm wheel 27. The output shaft 28 is coupled to a known window regulator for lifting and lowering a vehicle window glass.

Figure 2:
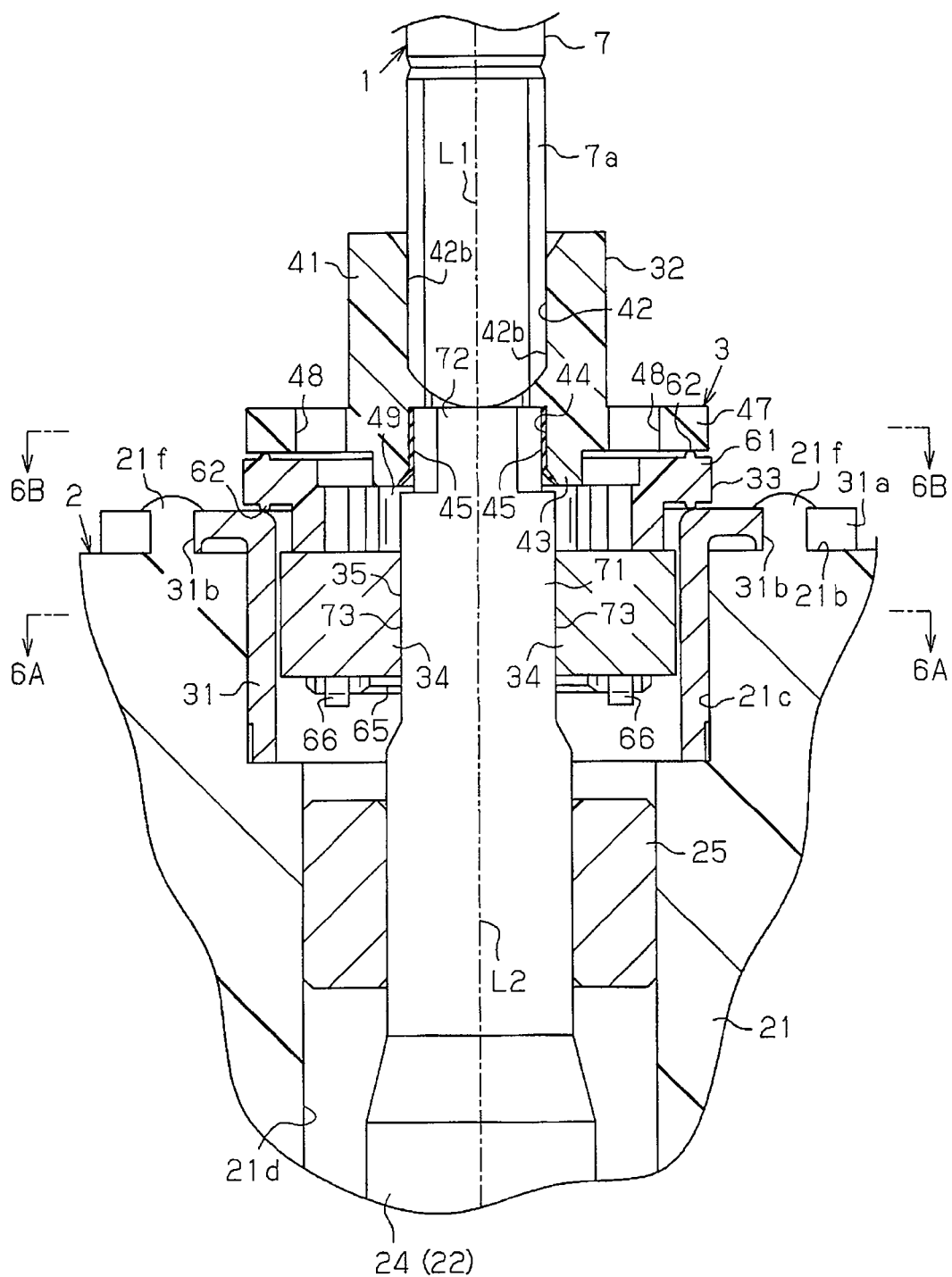
FIG. 2 is an enlarged partial cross-sectional view illustrating the motor shown in FIG. 1.
Figure 3:
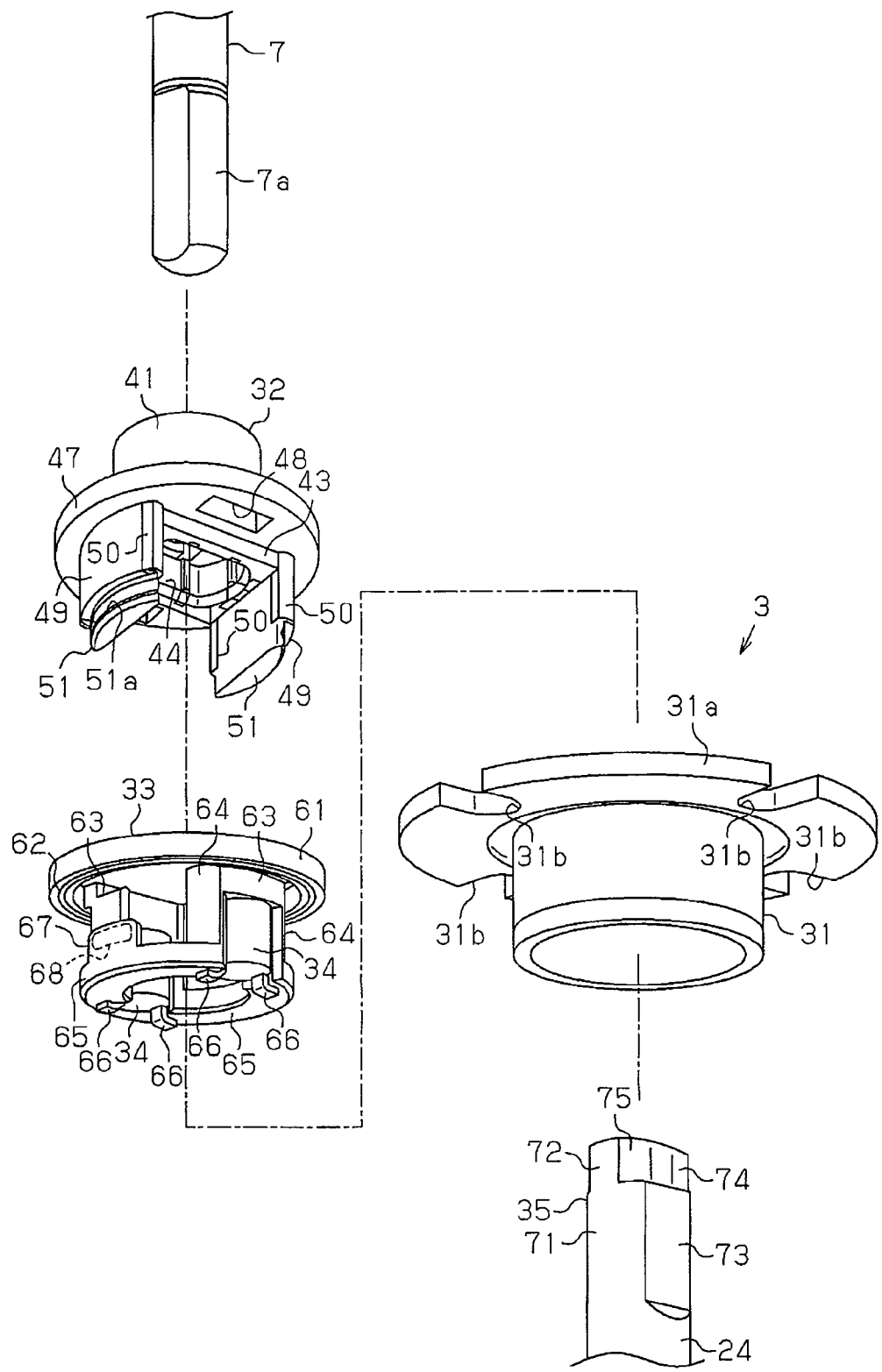
FIG. 3 is an exploded perspective view of the clutch shown in FIG. 2.

The clutch accommodating recess 21c accommodates the clutch 3, which is capable of coupling the rotary shaft 7 and the worm shaft 24 to each other. As shown in FIGS. 2 and 3, the clutch 3 includes a clutch housing 31, a driving-side rotor 32, a support member 33, rolling elements 34, and a driven-side rotor 35.

The clutch housing 31 is substantially cylindrical. A brim-like fixing flange portion 31a, which extends radially outward, is formed at one of the clutch housing 31 in the axial direction. The outer diameter of a cylindrical portion of the clutch housing 31 is substantially the same as the inner diameter of the clutch accommodating recess 21c. The outer diameter of the fixing flange portion 31a is greater than the inner diameter of the clutch accommodating recess 21c. The fixing flange portion 31a has fixing recesses 31b formed at four positions, which are separated at equal angular intervals along the circumferential direction. Each fixing recess 31b extends through the fixing flange portion 31a along the axial direction, and opens radially outward.

As shown in FIG. 2, the clutch housing 31 is inserted into the clutch accommodating recess 21c until the fixing flange portion 31a contacts the bottom of the fitting recess 21b, so that the fixing flange portion 31a is fixed to the gear housing 21. Specifically, four fixing protrusions 21f are formed on the bottom of the fitting recess 21b about the opening of the clutch accommodating recess 21c. The fixing protrusions 21f are separated from each other at equal angular intervals and protrude in the axial direction. The fixing protrusions 21f are integrally formed with the resin gear housing 21. The length of the fixing protrusions 21f along the axial direction is greater than the thickness of the fixing flange portion 31a. The four fixing protrusions 21f are inserted in the four fixing recesses 31b of the fixing flange portion 31a, which contacts the bottom of the fitting recess 21b, and extend through the fixing flange portion 31a in the axial direction. The distal end of each fixing protrusions 21f is subjected to thermal swaging, so that the clutch housing 31 is fixed to the gear housing 21 to be immovable along the axial direction and locked against rotation along the circumferential direction. The clutch housing 31, which is fixed to the gear housing 21, arranged to be coaxial with the rotary shaft 7 and the worm shaft 24.

Figure 6A:
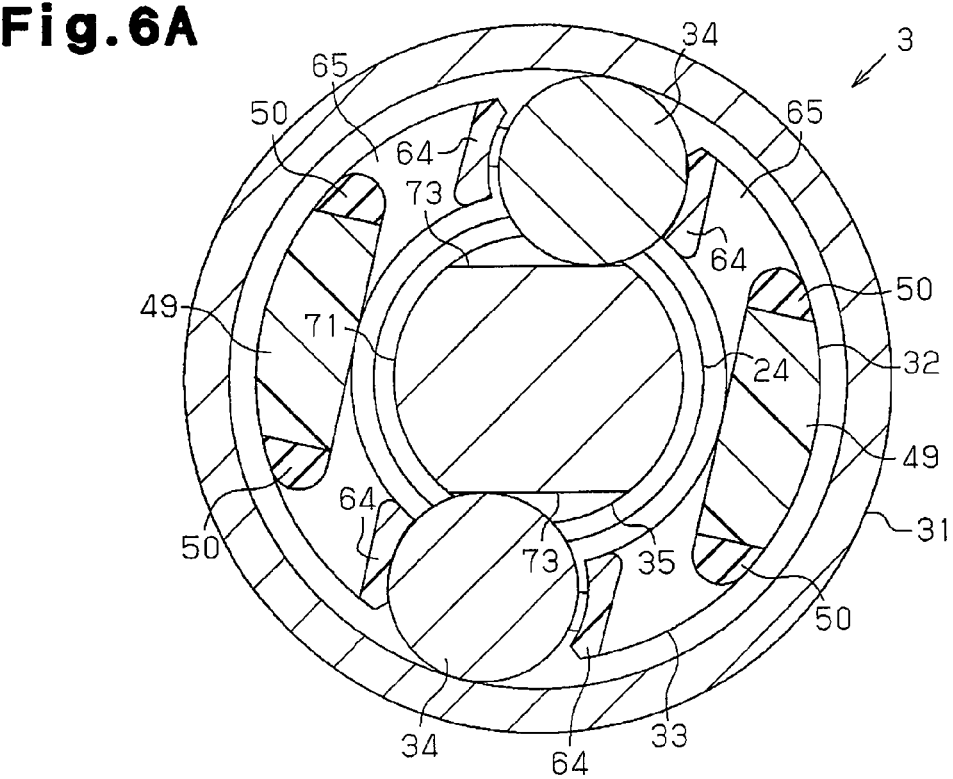
FIG. 6A is a cross-sectional view taken along line 6A-6A in FIG. 2.
Figure 6B:
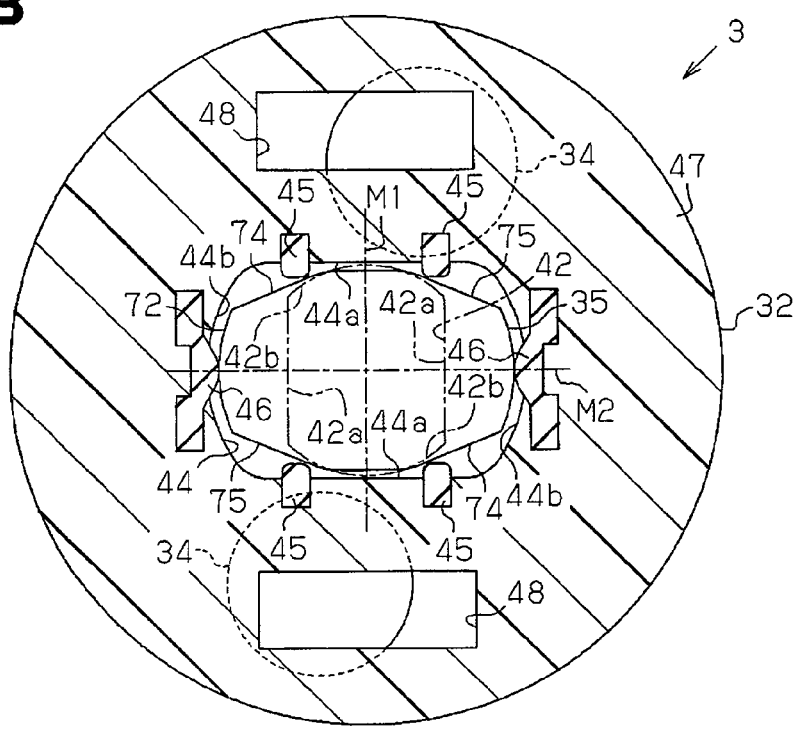
FIG. 6B is a cross-sectional view taken along line 6B-6B in FIG. 2.

The driving-side rotor 32 has a substantially columnar drive shaft coupling portion 41. The outer diameter of the drive shaft coupling portion 41 is less than the inner diameter of the clutch housing 31. A drive shaft insertion hole 42 is formed at a center in the radial direction of the drive shaft coupling portion 41. The drive shaft insertion hole 42 extends through the drive shaft coupling portion 41 along the axial direction. The drive shaft insertion hole 42 has a cross-sectional shape that corresponds to the cross-sectional shape of the coupling portion 7a of the rotary shaft 7. That is, as shown in FIG. 6B, a pair of flat surfaces 42a and two coupling surfaces 42b are formed on the inner circumferential surface of the drive shaft insertion hole 42. The flat surfaces 42a are separated from each other from each other along the radial direction and parallel with each other. Each coupling surface 42b couples adjacent ends of the flat surfaces 42a. Therefore, when viewed along the axial direction, the drive shaft insertion hole 42 is shaped like an athletic track with the longitudinal direction parallel with the flat surfaces 42a and transverse direction perpendicular to the flat surfaces 42a. As shown in FIG. 2, the coupling portion 7a is press-fitted in the drive shaft insertion hole 42, so that the driving-side rotor 32 is coupled to and integrally rotatable with the rotary shaft 7. The rotary shaft 7 and the driving-side rotor 32, which is coupled to the rotary shaft 7, are coaxial (the central axes are aligned).

Figure 4:
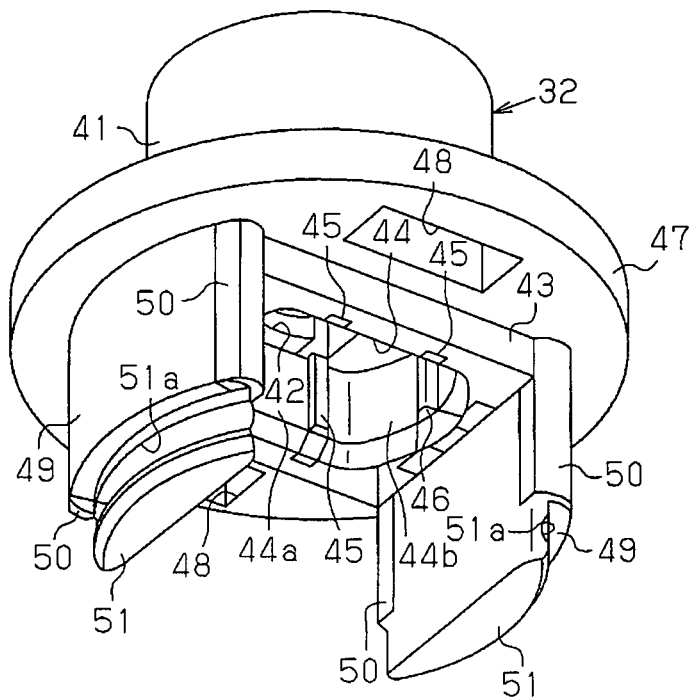
FIG. 4 is a perspective view of the driving-side rotor shown in FIG. 3.

As shown in FIGS. 2 and 4, a driving-side coupling portion 43 is integrally formed with an axial end of the drive shaft coupling portion 41 closer to the speed reducing section 2 (the lower end as viewed in FIG. 2). The driving-side coupling portion 43 protrudes axially from the lower end of the drive shaft coupling portion 41 and substantially has a square prism shape. The outer shape of the driving-side coupling portion 43 is formed to be larger than the drive shaft insertion hole 42. A driven shaft insertion hole 44 is formed in the driving-side coupling portion 43. The driven shaft insertion hole 44 extends through the driving-side coupling portion 43 along the axial direction. As shown in FIG. 6B, a pair of driving-side transmission surfaces 44a and two coupling surfaces 44b are formed on the inner circumferential surface of the driven shaft insertion hole 44. The driving-side transmission surfaces 44a are separated from each other along the radial direction and parallel with each other. Each coupling surface 44b connects adjacent ends of the driving-side transmission surfaces 44a. Each driving-side transmission surface 44a is a flat surface parallel with the axial direction, and each coupling surface 44b is an arcuate curved surface. Therefore, when viewed along the axial direction, the driven shaft insertion hole 44 is shaped like an athletic track with the longitudinal direction parallel with the driving-side transmission surfaces 44a and transverse direction perpendicular to the driving-side transmission surfaces 44a. The central axis of the driven shaft insertion hole 44 coincides with the central axis of the drive shaft insertion hole 42. The driven shaft insertion hole 44 is displaced relative to the drive shaft insertion hole 42 by 90° along the rotational direction of driving-side rotor 32 (that is, the rotational direction of the rotary shaft 7). That is, the flat surfaces 42a of the drive shaft insertion hole 42 and the driving-side transmission surfaces 44a of the driven shaft insertion hole 44 are displaced by 90° about the central axis of the driving-side rotor 32 (the central axis L1 of the rotary shaft 7 in a state where the clutch 3 is assembled to the motor). Therefore, when the driving-side rotor 32 is viewed along the axial direction, a center line M1, which extends through the center in the transverse direction of the drive shaft insertion hole 42 and along the longitudinal direction, is perpendicular to a center line M2, which extends through the center in the transverse direction of the driven shaft insertion hole 44 and along the longitudinal direction.

Buffer members 45, which are made of an elastic material such as rubber, are provided on each driving-side transmission surface 44a. On each driving-side transmission surface 44a, the buffer members 45 are formed at two positions, which are separated from each other along the direction of the center line M2 of the driven shaft insertion hole 44. The buffer members 45 extend from one end of the driving-side transmission surfaces 44a to the other end (see FIG. 4). The buffer members 45 project slightly into the driven shaft insertion hole 44 from the driving-side transmission surfaces 44a. The buffer members 45 are formed at positions that correspond to positions where first and second driven-side transmission surfaces 74, 75, which will be discussed below, contact the driving-side transmission surfaces 44a.

An elastic member 46, which is made of an elastic material such as rubber, is provided on each coupling surface 44b of the driven shaft insertion hole 44. The elastic members 46 are each formed at a center in the circumferential direction of each coupling surface 44b, and extends along the axial direction from one end of the coupling surface 44b from one end to the other end along the axial direction (see FIG. 4). The elastic members 46 project into the driven shaft insertion hole 44 from the driving-side transmission surfaces 44a.

As shown in FIGS. 2 and 4, a substantially annular brim portion 47 (contact portion) is integrally formed with the proximal portion (upper end as viewed in FIGS. 2 and 4) of the driving-side coupling portion 43. Specifically, the brim portion 47 is located at a portion adjacent to the lower end of the drive shaft coupling portion 41 and extends in the radial direction). The outer diameter of the brim portion 47 is slightly larger than the inner diameter of the clutch housing 31. Check windows 48 are formed in the brim portion 47 at positions on either side of the transverse direction of the driven shaft insertion hole 44 (the direction perpendicular to the center line M2 in FIG. 6 B). The check windows 48 extend through the brim portion 47 in the axial direction.

As shown in FIG. 4, rolling element releasing portions 49 are integrally formed with the driving-side coupling portion 43 on both sides of the driving-side coupling portion 43 in the longitudinal direction of the driven shaft insertion hole 44 (the same direction as the direction of the center line M2 as viewed in FIG. 6B). That is, the rolling element releasing portions 49 are located at radially outer side of the coupling surfaces 44b. The two rolling element releasing portions 49 are formed to be separated from each other by 180° along the circumferential direction, and extend axially in the direction opposite to the drive shaft coupling portion 41. Shock absorbing members 50, which are made of an elastic material such as rubber, are integrally provided on the circumferential ends of each rolling element releasing portion 49. The shock absorbing members 50, the buffer members 45, and the elastic members 46, which are made of elastic material, are integrally molded with corresponding resin parts of the driving-side rotor 32.

Figure 5:
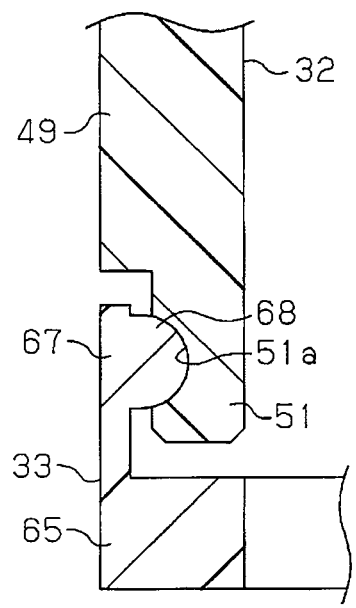
FIG. 5 is an enlarged partial cross-sectional view illustrating the support member and the driving-side rotor shown in FIG. 3 in an assembled state.

A driving-side engaging portion 51 is formed at the distal end of each rolling element releasing portions 49 to be integrated with the rolling element releasing portion 49. The radially outer side of each driving-side engaging portion 51 is located radially inward of the radially outer sides of the rolling element releasing portions 49. An engaging groove 51a extending in the circumferential direction is formed on the radially outer surface of each driving-side engaging portion 51. The engaging groove 51a is recessed inward in the radial direction on the radially outer surface of the driving-side engaging portion 51 and opens radially outward. The engaging groove 51a extends from one end to the other in the circumferential direction of the driving-side engaging portion 51. Further, the engaging groove 51a is curved along an arc that has the center of curvature on the central axis of the driving-side rotor 32 (the same as the central axis L1 of the rotary shaft 7 in a state where the clutch 3 is assembled to the motor). As shown in FIG. 5, in the cross-section perpendicular to the longitudinal direction of the engaging groove 51a, the inner surface of the engaging groove 51a is arcuately concave radially inward.

As shown in FIG. 2, the drive shaft coupling portion 41 and the driving-side coupling portion 43 of the above described driving-side rotor 32 are arranged outside of the clutch housing 31 (specifically, between the clutch housing 31 and the brush holder 10), and the two rolling element releasing portions 49 are inserted into the clutch housing 31. As shown in FIG. 6A, the radially outer surface of each of the rolling element releasing portions 49 arranged inside the clutch housing 31 faces the inner circumferential surface of the clutch housing 31 in the radial direction.

As shown in FIGS. 2 and 3, the resin support member 33 has an annular ring portion 61. The outer diameter of the ring portion 61 is substantially equal to the outer diameter of the brim portion 47 of the driving-side rotor 32. A contact protrusion 62 is formed on either axial side of the ring portion 61. Each contact protrusion 62 protrudes in the axial direction and extends along the circumferential direction. Inward extensions 63 are formed at circumferentially separated two positions of the ring portion 61 (in the present embodiment, positions separated from each other by 180°). The inward extensions 63 extend radially inward from the ring portion 61. A pair of rolling element supports 64 are integrally formed with each inward extension 63. The rolling element supports 64 in each pair extend in the axial direction from the corresponding inward extension 63 and separated from each other along the circumferential direction. The adjacent distal ends of two pairs of the rolling element supports 64 are coupled to each other by an arcuately extending reinforcing portion 65. Holding claws 66 are formed at the distal ends of the rolling element supports 64 of each pair. The holding claws 66 protrude toward each other (in the circumferential direction).

Further, an extension 67 is formed at the circumferential center of each reinforcing portion 65. The extension 67 extends axially toward the ring portion 61. The extensions 67 are arcuate plates curved along the reinforcing portions 65. A supporting-side engaging portion 68 is integrally formed with each extension 67. The supporting-side engaging portion 68 protrudes radially inward. The supporting-side engaging portions 68 are curved arcuately along the reinforcing portions 65. As shown in FIG. 5, the distal surface of each supporting-side engaging portion 68 is formed to be arcuate in the cross section perpendicular to the longitudinal direction of the supporting-side engaging portions 68, so as to bulge radially inward and correspond to the engaging groove 51a formed in the driving-side rotor 32.

As shown in FIG. 3, each rolling element 34 is inserted in the rolling element supports 64 of each pair. Each rolling element 34 is columnar. Each rolling element 34 is arranged between the corresponding pair of the rolling element supports 64, so that the two rolling elements 34 are rotatably supported by the support members 33 (about the central axes of the rolling elements 34) and parallel with each other at equal angular intervals (180° in the present embodiment). The movement in the axial direction of each rolling element 34 relative to the support members 33 is restricted by the inward extensions 63 and the holding claws 66.

The support members 33, which hold the two rolling elements 34, are assembled to the driving-side rotor 32 by engagement between the two supporting-side engaging portions 68 and the driving-side engaging portions 51. The two supporting-side engaging portions 68 and the two driving-side engaging portions 51 are engaged with each other by inserting the two the rolling element releasing portions 49 in the ring portion 61 and then inserting the two supporting-side engaging portions 68 into the engaging groove 51a (see FIG. 5). By inserting the two rolling element releasing portions 49 into the ring portion 61, each rolling element releasing portion 49 is arranged between the corresponding pair of the rolling element supports 64 (see FIG. 6A). The engaged driving-side engaging portions 51 and supporting-side engaging portions 68 inhibit relative movement between the support member 33 and the driving-side rotor 32 in the axial direction. In contrast, the driving-side rotor 32 and the support member 33 can be moved relative to each other along the circumferential direction while allowing the distal surfaces of the supporting-side engaging portions 68 and the inner circumferential surface of engaging groove 51a to slide on each other.

Figure 7A:
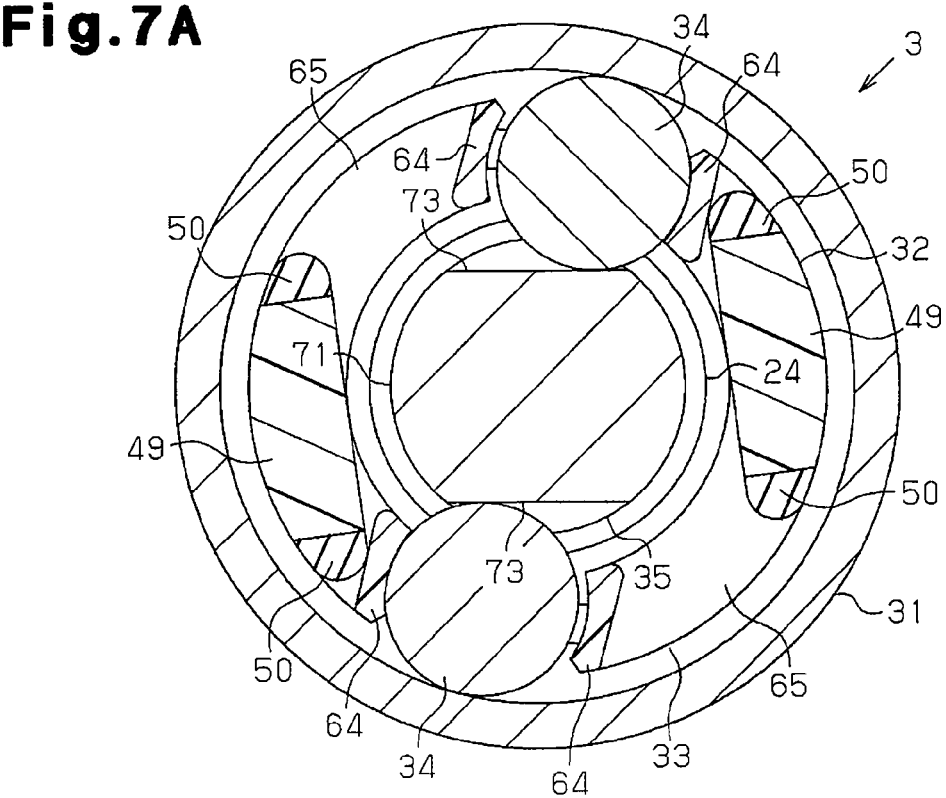
FIGS. 7A and 7B are cross-sectional views showing the clutch of FIGS. 6A and 6B in a state where the rotary shaft is driven to rotate.

As shown in FIG. 7A, when the driving-side rotor 32 rotates relative to the support member 33, each rolling element releasing portions 49 can contact the corresponding rolling element support 64, which is located on the advancing side of the driving-side rotor 32 (circumferential direction). As described above, the contact protrusion 62 is formed on each of the axial end faces of the ring portion 61. Therefore, as shown in FIG. 2, the ring portion 61 and the brim portion 47 face each other in the axial direction with the support members 33 assembled to the driving-side rotor 32, and the brim portion 47 contacts the contact protrusion 62 that is formed on the end face of the ring portion 61 that faces the brim portion 47 in the axial direction. The rolling elements 34 are exposed toward the drive shaft coupling portion 41 through the check windows 48 formed in the brim portion 47.

As shown in FIGS. 2 and 6A, the rolling element supports 64, which each receive a corresponding rolling element 34, are inserted in the clutch housing 31 together with the rolling element releasing portions 49. The ring portion 61 is located outside the clutch housing 31 and between the clutch housing 31 and the brim portion 47. Of the end faces of the ring portion 61, the contact protrusion 62 formed on the end face that faces the clutch housing 31 in the axial direction contacts the opening end face of the clutch accommodating recess 21c. The outer circumferential surface of each rolling element 34 arranged in the clutch housing 31 can contact the inner circumferential surface of the clutch housing 31.

As shown in FIG. 2, the driven-side rotor 35 is integrally formed with the proximal end of the worm shaft 24 (the upper end as viewed in FIG. 2). The driven-side rotor 35 includes a driven-side control portion 71 and a driven-side coupling portion 72, which are aligned along the axial direction.

The driven-side control portion 71 is shaped like a pillar that is integrally formed with the proximal end of the worm shaft 24 and extends along the axial direction of the worm shaft 24. The central axis of the driven-side control portion 71 coincides with the central axis L2 of the worm shaft 24. That is, the driven-side control portion 71 is formed to be coaxial with the worm shaft 24. The outer diameter of the driven-side control portion 71 is less than or equal to the maximum outer diameter of the worm shaft 24. In the present embodiment, the outer diameter of the driven-side control portion 71 is equal to the outer diameter of a part of the worm shaft 24 that is supported by the bearing 25 (herein after referred to as a supported part). As shown in FIG. 6A, a pair of control surfaces 73 are formed on the outer circumferential surface of the driven-side control portion 71. The control surfaces 73 are formed at two positions that are separated from each other by equal angular intervals in the circumferential direction (180° in the present embodiment) on the outer circumferential surface of the driven-side control portion 71, and are parallel with the axial direction. Further, the pair of control surfaces 73 have surfaces parallel with each other, and the axial length of each control surface 73 is greater than that of the rolling elements 34. The two control surfaces 73 are located (radially) inward of the outer shapes of the support parts of the worm shaft 24 when viewed along the axial direction. That is, the distance between each control surface 73 and the central axis L2 of the worm shaft 24 is less than the half the outer diameter of the supported part.

As shown in FIG. 2, the driven-side coupling portion 72 is integrally formed with the driven-side control portion 71 and is located at the opposite axial end to the worm shaft 24. The driven-side coupling portion 72 is formed continuously in the axial direction with the driven-side control portion 71, that is, with the control surfaces 73. That is, the driven-side coupling portion 72 and the driven-side control portion 71 are adjacent to each other in the axial direction and are not separated from each other in the axial direction without any other members in between. The driven-side coupling portion 72 is shaped like a pillar that extends in the axial direction of the worm shaft 24. The central axis of the driven-side coupling portion 72 coincides with the central axis L2 of the worm shaft 24. That is, the driven-side coupling portion 72 is formed to be coaxial with the worm shaft 24. The axial length of the driven-side coupling portion 72 is slightly greater than that of the driven shaft insertion hole 44 formed in the driving-side coupling portion 43. The outer diameter of the driven-side coupling portion 72 is less than or equal to the maximum outer diameter of the worm shaft 24. In the present embodiment, the outer diameter of the driven-side coupling portion 72 is less than the outer diameter of the supported part of the worm shaft 24 (that is, less than the outer diameter of the driven-side control portion 71). Further, the driven-side coupling portion 72 is formed to have a slightly smaller diameter than the driven shaft insertion hole 44.

As shown in FIG. 6B, the driven-side coupling portion 72 has a substantially elliptic shape in a cross-section perpendicular to the axial direction, and that cross-sectional shape is constant along the axial direction. When the driven-side coupling portion 72 is viewed along the axial direction, the longitudinal direction of the driven-side coupling portion 72 is parallel with the control surfaces 73, and the transverse direction of the driven-side coupling portion 72 (direction perpendicular to the longitudinal direction of the driven-side coupling portion 72) is perpendicular to the control surfaces 73. The axial length of the driven-side coupling portion 72 is slightly greater than that of the driving-side transmission surfaces 44a.

As shown in FIG. 6B, a pair of first driven-side transmission surfaces 74 and a pair of second driven-side transmission surfaces 75 are formed on the outer circumferential surface of the driven-side coupling portion 72. One of the first driven-side transmission surfaces 74 is separated from the other first driven-side transmission surface 74 in the circumferential direction by 180°. The two first driven-side transmission surfaces 74 are flat surfaces that are parallel with the axial direction and to each other.

The distance between the two first driven-side transmission surfaces 74 is equal to the distance between the pair of driving-side transmission surfaces 44a formed in the driven shaft insertion hole 44 of the driving-side rotor 32. Each second driven-side transmission surface 75 is formed at a position between the two first driven-side transmission surfaces 74. One of the second driven-side transmission surfaces 75 is separated from the other second driven-side transmission surface 75 in the circumferential direction by 180°. The two second driven-side transmission surfaces 75 are flat surfaces that are parallel with the axial direction and to each other. The distance between the two second driven-side transmission surfaces 75 is equal to the distance between the pair of driving-side transmission surfaces 44a formed in the driven shaft insertion hole 44 of the driving-side rotor 32. The first driven-side transmission surfaces 74 and the second driven-side transmission surfaces 75 are formed to extend from one end to the other of the driven-side coupling portion 72 along the axial direction.

As shown in FIG. 2, the driven-side rotor 35 described above is inserted into the clutch housing 31 and the support member 33 from the side opposite to the driving-side rotor 32. The driven-side coupling portion 72 is inserted into the driven shaft insertion hole 44, and the driven-side control portion 71 is located between the two rolling elements 34. The driven-side rotor 35 is arranged to be coaxial with the clutch housing 31, the driving-side rotor 32, and the support member 33. The distal surface of the driven-side coupling portion 72 (that is, the end face in the axial direction of the driven-side rotor 35 that is opposite to the worm shaft 24) contacts the distal surface of the coupling portion 7a of the rotary shaft 7, which is press fitted in the drive shaft insertion hole 42 with respect to the axial direction in the driving-side rotor 32.

As shown in FIG. 6S, the driven-side coupling portion 72 is loosely fitted in the driven shaft insertion hole 44 to overlap with the driving-side coupling portion 43 in the axial direction, so as to be integrally rotatable with the driving-side rotor 32. The elastic members 46 and the buffer members 45 are located between the outer circumferential surface of the driven-side coupling portion 72 and the inner circumferential surface of the driven shaft insertion hole 44, which face each other in the radial direction. In the driven shaft insertion hole 44, the pair of elastic members 46 contact the driven-side coupling portion 72 from both sides in the longitudinal direction of the driven shaft insertion hole 44. The four buffer members 45 are located between the two first driven-side transmission surfaces 74 and the driving-side transmission surfaces 44a and between the two second driven-side transmission surfaces 75 and the driving-side transmission surfaces 44a. When the driving-side rotor 32 rotates relative to the driven-side rotor 35 about the central axis, the leading ones in the rotational direction of the pair of first driven-side transmission surfaces 74 and the pair of second driven-side transmission surfaces 75 contact the facing driving-side transmission surfaces 44a in accordance with the rotational direction of the driving-side rotor 32 (that is, the rotational direction of the driving-side transmission surfaces 44a). At this time, the driving-side transmission surfaces 44a contact the leading ones of the driven-side transmission surfaces while elastically deforming the buffer members 45, which are located between the driving-side transmission surfaces 44a and the leading ones of the driven-side transmission surfaces. This allows the driving-side rotor 32 and the driven-side rotor 35 to be integrally rotatable. That is, the driving-side rotor 32 and the driven-side rotor 35 are engaged with each other with respect to the rotational direction, so that the rotational driving force of the driving-side rotor 32 can be transmitted to the driven-side rotor 35.

Also, as shown in FIG. 6A, the driven-side control portion 71 is inserted in the support member 33 such that the rolling elements 34 are located between the control surfaces 73 and the inner circumferential surface of the clutch housing 31. The distance between each control surface 73 and the inner circumferential surface of the clutch housing 31 (the distance along a direction perpendicular to the control surfaces 73) varies along the rotational direction of the driven-side rotor 35. In the present embodiment, the distance between each control surface 73 and the inner circumferential surface of the clutch housing 31 is the greatest at the circumferential center of the control surfaces 73, and gradually decreases from the circumferential center of the control surface 73 toward the circumferential ends. The distance between the circumferential center of each control surface 73 and the inner circumferential surface of the clutch housing 31 is greater than the outer diameter of the rolling elements 34. Also, the distance between each circumferential end of each control surface 73 and the inner circumferential surface of the clutch housing 31 is less than the outer diameter of the rolling elements 34.

Next, operation of the above described motor will be described, focusing on the operation of the clutch 3.

With reference to FIG. 1, if a load is applied to the output shaft 28 from the driven side (that is, the window glass) in a state where the motor section 1 is in a stopped state, that is, where the rotary shaft 7 and the driving-side rotor 32 are not driven to rotate, the load acts to rotate the driven-side rotor 35 (the worm shaft 24). Then, as shown in FIG. 6A, each control surface 73 of the driven-side rotor 35 contacts the corresponding rolling element 34 located between the control surface 73 and the inner circumferential surface of the clutch housing 31, and holds the rolling element 34 with the inner circumferential surface of the clutch housing 31. FIG. 6A shows a state of the clutch 3 where the driven-side rotor 35 receiving a force that acts to rotate the driven-side rotor 35 counterclockwise. Since the clutch housing 31 is fixed to the gear housing 21 so as to be unrotatable in the circumferential direction as described above, the driven-side rotor 35 is prevented from rotating further by the clutch housing 31 and the rolling elements 34. As a result, the worm shaft 24 is prevented from rotating, and the rotary shaft 7 is not rotated via the worm shaft 24. The part of each control surface 73 that contacts the rolling element 34 is closer to a circumferential end of the control surface 73 than to the circumferential center of the control surface 73. Although FIG. 6A shows an example in which the driven-side rotor 35 receives a counterclockwise rotating force, rotation is prevented also in a case where the driven-side rotor 35 receives a clockwise rotating force.

Figure 7B:
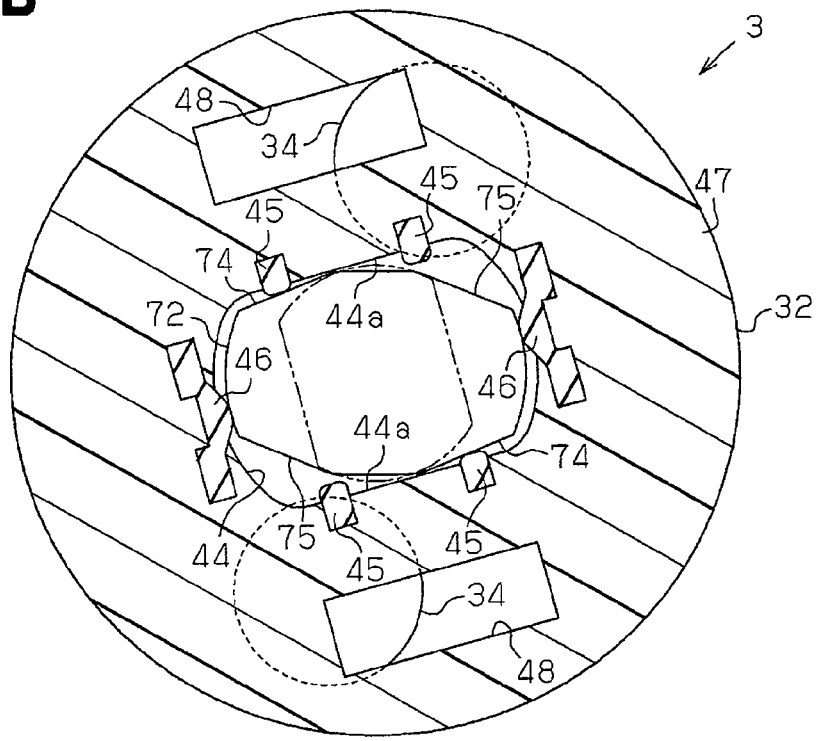

On the other hand, when the motor section 1 is operating, that is, when the rotary shaft 7 is driven to rotate, the driving-side rotor 32 is driven to rotate integrally with the rotary shaft 7 about the central axis L1 of the rotary shaft 7 as shown in FIGS. 7A and 7B (see FIG. 2). FIGS. 7A, 7B, 8A and 8B show a state of the clutch 3 in which the rotary shaft 7 and the driving-side rotor 32 are driven to rotate counterclockwise. The driving-side rotor 32 rotates relative to the support member 33 in a stopped state. Each rolling element releasing portion 49 of the driving-side rotor 32 contacts the corresponding rolling element support 64 located on the leading side of the rolling element releasing portion 49 in the rotational direction, so as to push the rolling element support 64 in the rotational direction. Then, the rolling elements 34, which have been held by the rolling element supports 64, are pushed out of the spaces between the inner circumferential surface of the clutch housing 31 and the control surfaces 73, so as to be released from a state of being held by the inner circumferential surface of the clutch housing 31 and the control surfaces 73. This unlocks the driven-side rotor 35. At this time, as shown in FIG. 7B, the driving-side transmission surfaces 44a of the driving-side rotor 32 do not contact the first driven-side transmission surfaces 74 of the driven-side rotor 35, and the driven-side rotor 35 is held in a stopped state.

Figure 8A:
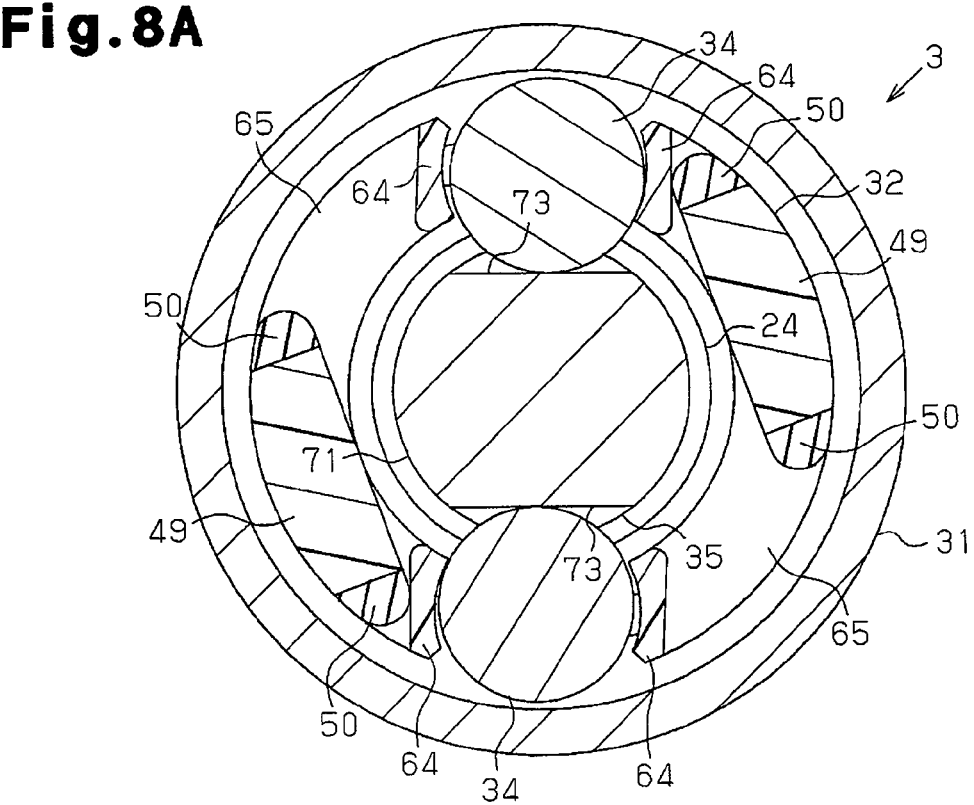
FIGS. 8A and 8B are cross-sectional views showing the clutch of FIGS. 6A and 6B in a state where the rotary shaft is driven to rotate.
Figure 8B:
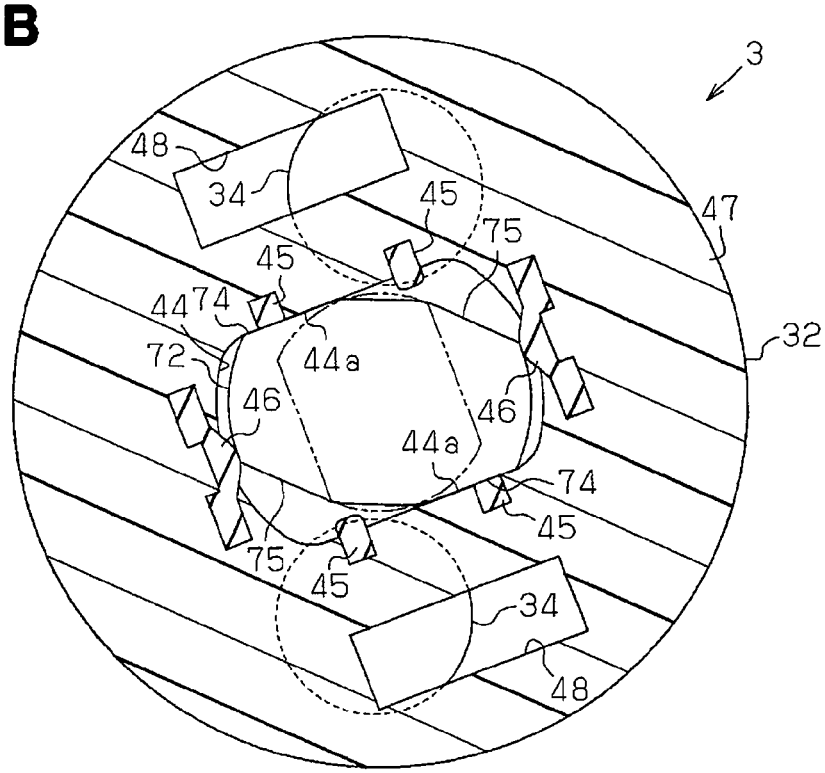

When the driving-side rotor 32 is driven to rotate further by the rotary shaft 7 as shown in FIG. 8B, the driving-side transmission surfaces 44a contact the first driven-side transmission surfaces 74 with respect to the rotational direction, while pushing and elastically deforming the buffer members 45 located between the driving-side transmission surfaces 44a and the first driven-side transmission surfaces 74. This allows rotational driving force to be transmitted from the driving-side rotor 32 to the driven-side rotor 35 via the driving-side transmission surfaces 44a and the first driven-side transmission surfaces 74. Therefore, the driven-side rotor 35 is rotated about the central axis (the same as the central axis L2 of the worm shaft 24), together with the driving-side rotor 32. At this time, as shown in FIG. 8A, the support member 33 is pressed by the rolling element releasing portions 49, so as to be rotated integrally with the driving-side rotor 32. Therefore, the rolling elements 34 rotate together with the driven-side rotor 35 while being guided by the support member 33. Specifically, each rolling element 34 is located at the circumferential center of the corresponding control surface 73, and is rotated about the central axis of the driven-side rotor 35 while being supported by the support member 33, without being held by the inner circumferential surface of the clutch housing 31 and the control surface 73.

When the worm shaft 24 is rotated as the driven-side rotor 35 rotates, the rotation of the worm shaft 24 is reduced by the worm portion 24a and the worm wheel 27, and output from the output shaft 28. Therefore, the window regulator, which is operatively coupled to the output shaft 28, is activated to open or close (lift or lower) the window glass. Although FIGS. 7A, 7B, 8A and 8B show a state of the clutch 3 where the driving-side rotor 32 is rotated counterclockwise, rotational driving force is similarly transmitted from the driving-side rotor 32 to the driven-side rotor 35 when the driving-side rotor 32 is rotated clockwise. However, in FIGS. 7A, 7B, 8A and 8B, if the driving-side rotor 32 is rotated clockwise, the driving-side transmission surfaces 44a contact the second driven-side transmission surfaces 75.

As described above, the first embodiment has the following advantages.

(1) In the driven-side rotor 35, the driven-side coupling portion 72, which is coupled to and integrally rotatable with the driving-side rotor 32, and the control surfaces 73, which hold the rolling elements 34 with the inner circumferential surface of the clutch housing 31 when the driving-side rotor 32 is not driven to rotate, are formed at different positions in the axial direction. That is, the driven-side coupling portion 72 and the control surfaces 73 do not overlap in the axial direction. Therefore, in the driven-side rotor 35, the driven-side coupling portion 72 and the control surfaces 73 are not adjacent to each other in the radial direction at the same position in the axial direction. This prevents the driven-side rotor 35 from having a shape that project in the radial direction. Accordingly, the size of the driven-side rotor 35 is reduced in the radial direction, and therefore, the size of the clutch 3 can be reduced in the radial direction.

(2) Since the driven-side coupling portion 72 and the control surfaces 73 are formed continuously along the axial direction, the driven-side rotor 35 is prevented from being extended in the axial direction. The clutch 3 is thus prevented from being large in size.

(3) When the driving-side rotor 32 is driven to rotate, the driving-side transmission surfaces 44a contact either the first driven-side transmission surfaces 74 or the second driven-side transmission surfaces 75 in the rotational direction. This allows rotational driving force of the driving-side rotor 32 to be efficiently transmitted to the driven-side rotor 35.

(4) The impact produced when the driving-side transmission surfaces 44a contact either the first driven-side transmission surfaces 74 or the second driven-side transmission surfaces 75 is absorbed by the buffer members 45. Therefore, noise generated when the driving-side transmission surfaces 44a contact the first driven-side transmission surfaces 74 and the second driven-side transmission surfaces 75 is suppressed.

(5) The driven-side coupling portion 72 of the driven-side rotor 35 is loosely fitted in the driving-side rotor 32 to be integrally rotatable with and overlap in the axial direction with the driving-side rotor 32. The elastic members 46 are placed between parts of the driving-side rotor 32 and the driven-side rotor 35 (the driven-side coupling portion 72) that face each other in the radial direction. Therefore, even if the central axis of the driving-side rotor 32 and the central axis of the driven-side rotor 35 are displaced from each other, the displacement is corrected (absorbed) by elastic deformation of the elastic members 46.

(6) Being supported by the support member 33, the two rolling elements 34 are stable in terms of the positions and orientations. The support member 33 contacts the brim portion 47 of the driving-side rotor 32, so as to be prevented from being moved further toward the driving side (that is, toward the motor section 1) by the brim portion 47. Further, since the brim portion 47 is formed integrally with the driving-side rotor 32, no additional parts are required for restricting movement of the support member 33 toward the driving side. This reduces the number of components.

(7) Whether the rolling elements 34 are present can be checked through the check windows 48 from the outside of the clutch 3. Since the presence or absence of the rolling elements 34 can be checked through the check windows 48 during assembly of the clutch 3, errors are prevented during installment of the rolling elements 34.

(8) The driving-side rotor 32 and the support member 33 are integrated by engaging the driving-side engaging portions 51 with the supporting-side engaging portions 68. Since the driving-side rotor 32 and the support member 33 can be installed integrally when assembling the clutch 3, the clutch 3 can be easily assembled.

(9) At the beginning of driven rotation of the driving-side rotor 32, the rolling element, releasing portions 49 push the rolling elements 34 along the circumferential direction of the clutch housing 31 (via the rolling element supports 64). This allows the rolling elements 34 to be easily released from the state held by the inner circumferential surface of the clutch housing 31 and the control surfaces 73. Also, since the driving-side rotor 32 and the driving-side engaging portions 51 are formed integrally with the rolling element releasing portions 49m, the number of components is reduced.

(10) The driven-side coupling portion 72 inserted in the driven shaft insertion hole 44 contacts the coupling portion 7a of the rotary shaft 7 inserted in the drive shaft insertion hole 42 in the axial direction. The driven shaft insertion hole 44 and the drive shaft insertion hole 42 are both formed in the driving-side rotor 32. This reduces chattering between the rotary shaft 7 and the driven-side rotor 35 in the axial direction.

(11) The flat surfaces 42a of the drive shaft insertion hole 42 and the driving-side transmission surfaces 44a of the driven shaft insertion hole 44 are displaced by 90° about the central axis of the driving-side rotor 32. This reduces inclination in the axial direction between the rotary shaft 7 inserted in the drive shaft insertion hole 42 and the driven-side rotor 35 having the driven-side coupling portion 72 inserted in the driven shaft insertion hole 44.

(12) The clutch 3 of the present embodiment has the driven-side rotor 35 with a shape that does not protrude in the radial direction. That is, the size of the clutch 3 is reduced in the radial direction. The clutch 3 with a reduced radial size reduces the size of the motor according to the present embodiment. Also, the driven-side coupling portion 72 and the control surfaces 73 are formed at different positions with respect to the axial direction. Accordingly, when the clutch 3 is installed in a motor, the distance between the bearing 25, which supports an axial end of the worm shaft 24 closer to the driven-side rotor 35, and the control surfaces 73 can be reduced. Therefore, even if the worm shaft 24 is inclined, inclination of the control surfaces 73 (imperfect alignment of a part of the driven-side rotor 35 where the control surfaces 73 are formed) is reduced. Thus, the control surfaces 73 and the inner circumferential surface of the clutch housing 31 can reliably hold the rolling elements 34. Since inclination of the worm shaft 24 does not affect the operation of the clutch 3, the operation of the clutch 3 is stable.

(13) The control surfaces 73 and the driven-side coupling portion 72 are located inward of the outer shapes of the worm shaft 24 when viewed along the axial direction. Therefore, the size of the driven-side rotor 35 is reliably reduced in the radial direction.

(14) The shock absorbing members 50 are provided on both sides in the circumferential direction of each rolling element releasing portion 49. Therefore, at the beginning of driven rotation of the driving-side rotor 32, noise generated when the rolling element releasing portions 49 contact the rolling element supports 64 is reduced.

(Second Embodiment)

A second embodiment of the present invention will now be described with reference to the drawings. In the second embodiment, the same reference numerals are given to those components that are the same as the corresponding components of the first embodiment, and detailed explanations are omitted.

Figure 9:
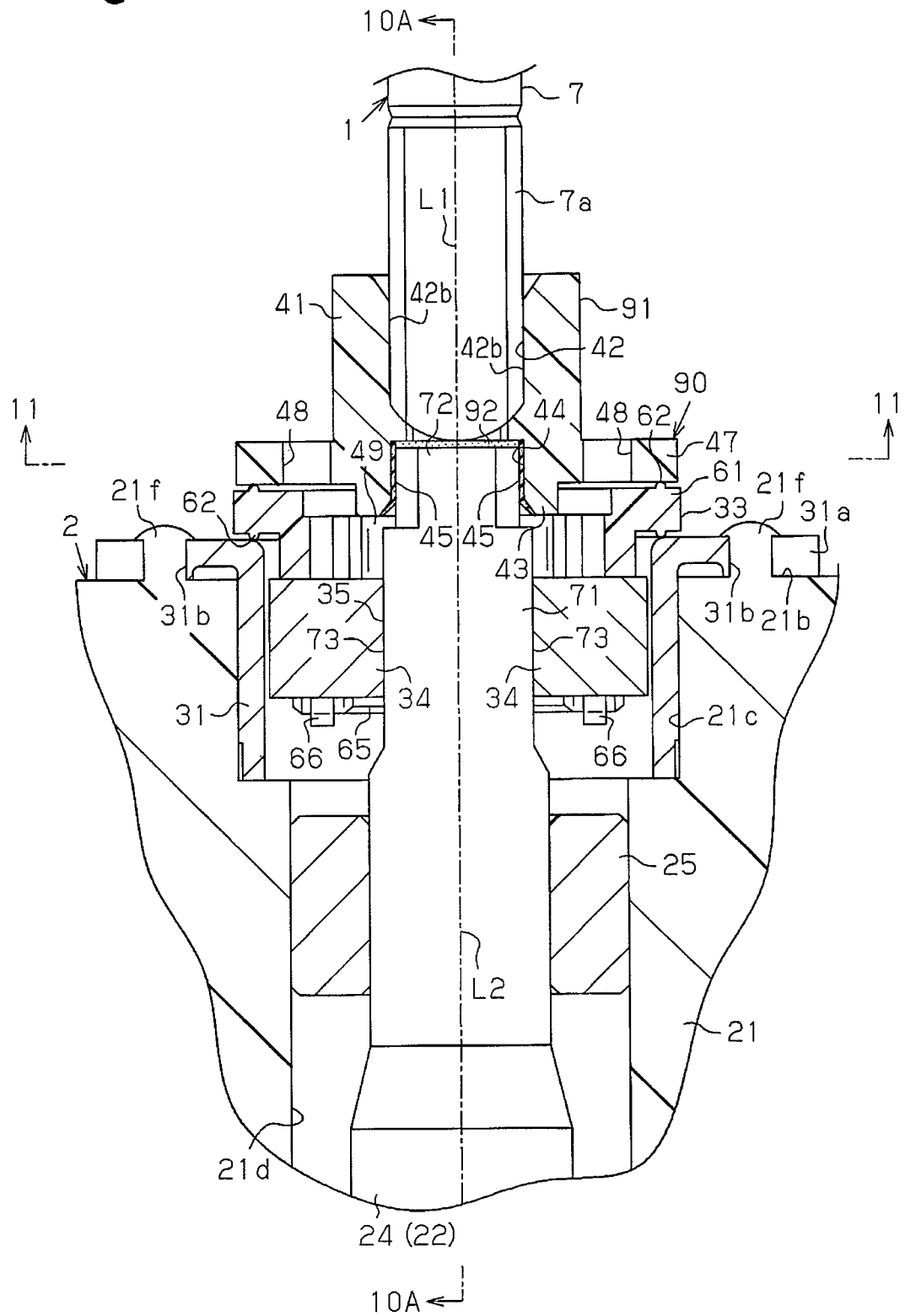
FIG. 9 is an enlarged partial cross-sectional view illustrating a motor according to a second embodiment of the present invention.

As shown in FIG. 9, a motor according to the second embodiment has a clutch 90 in addition to the clutch 3 of first embodiment. The clutch 90 has a driving-side rotor 91 in place of the driving-side rotor 32 of the first embodiment. Compared to the driving-side rotor 32 of the first embodiment, the driving-side rotor 91 further includes second buffer members 92 that absorb impact generated when the coupling portion 7a of the rotary shaft 7 contacts the driven-side coupling portion 72 in the axial direction.

Figure 10A:
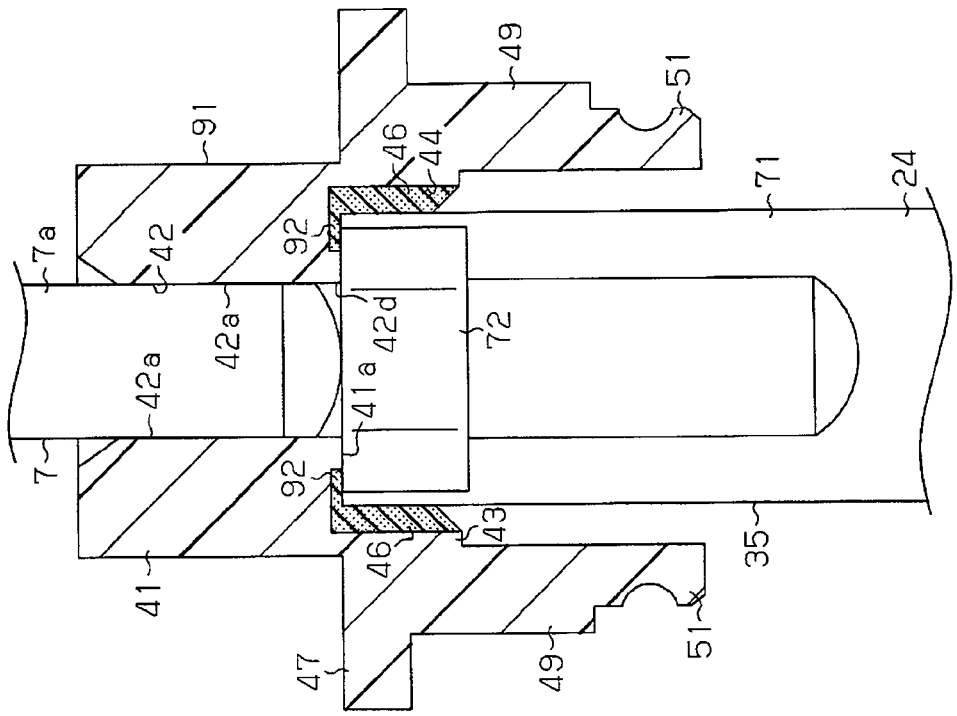
FIG. 10A is a cross-sectional view taken along line 10A-10A in FIG. 9.
Figure 11:
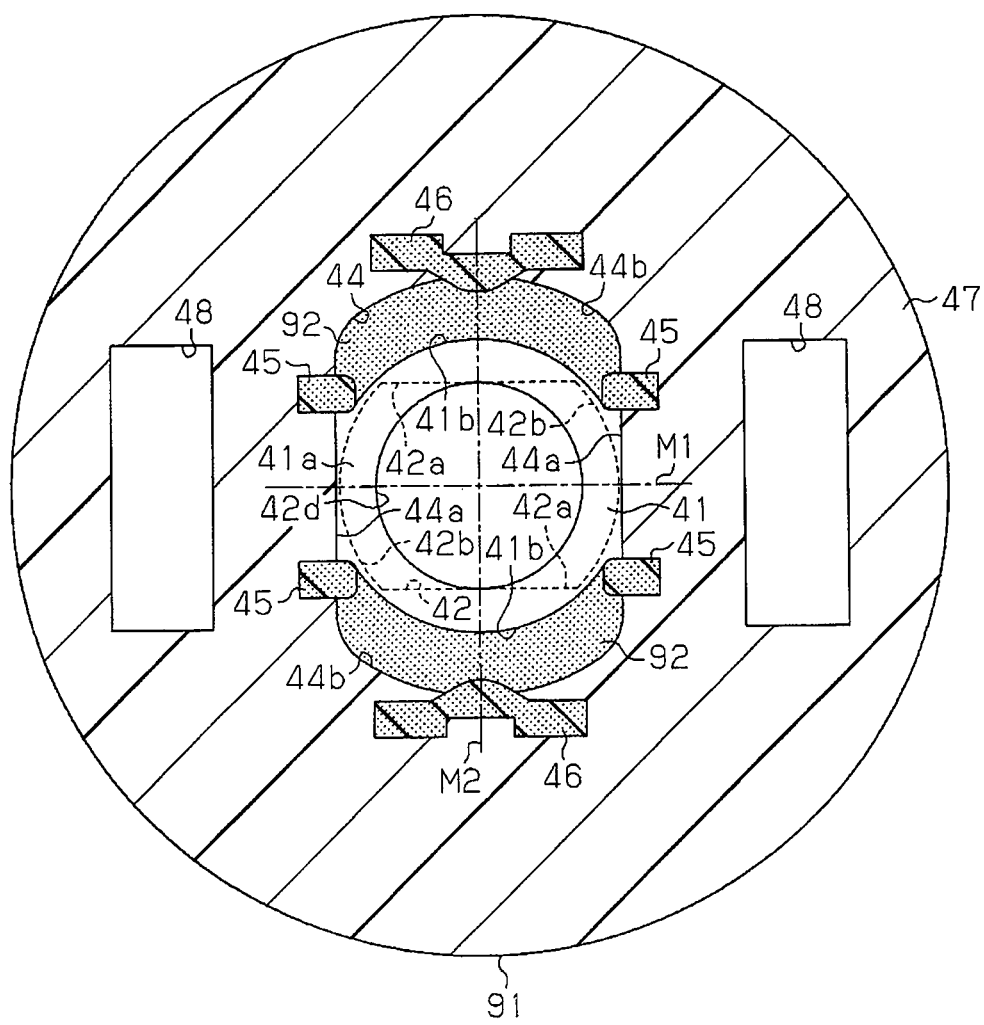
FIG. 11 is a cross-sectional view taken along line 11-11 of FIG. 9.

As shown in FIG. 10A, the driving-side rotor 91 has a drive shaft coupling portion 41. A pair of buffer recesses 41b are formed in an end face 41a (lower end face as viewed in FIG. 10A) of the drive shaft coupling portion 41 on the side corresponding to the driving-side coupling portion 43. As shown in FIGS. 10A and 11, the buffer recesses 41b are formed at positions about the opening 42d of the drive shaft insertion hole 42 facing the driven shaft insertion hole 44, and on both sides of the drive shaft insertion hole 42 in the transverse direction. Each buffer recess 41b is formed along the axial direction and opens to the driven shaft insertion hole 44. Each buffer recess 41b is arcuate along the coupling surface 44b on either side of the opening 42d.

Each buffer recess 41b receives a second buffer member 92 formed of an elastic material such as rubber. In the present embodiment, the second buffer members 92 are made of the same material as that of the buffer members 45 and the elastic members 46. In FIGS. 9 to 11, sections corresponding to the buffer members 45, the elastic members 46, and the second buffer member 92, which are made of elastic material, are filled with fine dots.

The two second buffer members 92 are each provided in one of the pair of buffer recesses 41b to surround the opening 42d. The two second buffer members 92 are formed at the opening 42d on both sides in the longitudinal direction of the driven shaft insertion hole 44. When viewed along the axial direction, the two second buffer members 92 extend along the coupling surfaces 44b and have arcuate shape surrounding the opening 42d. The two second buffer members 92 face the distal surface of the driven-side coupling portion 72 inserted in the driven shaft insertion hole 44 (that is, an axial end face of the driven-side rotor 35 that is opposite to the worm shaft 24) in the axial direction.

The second buffer members 92 project in the axial direction from the openings of the buffer recesses 41b and protrude into the driven shaft insertion hole 44 from the end face 41a. The two second buffer members 92 each contact the distal end face of the driven-side coupling portion 72 inserted in the driven shaft insertion hole 44. The amount of protrusion from the end face 41a of each second buffer member 92 in the axial direction is slightly greater than or equal to the width W of the clearance S between the driven-side rotor 35 and the rotary shaft 7 when the worm shaft 24 is maximally moved away from the rotary shaft 7 by the force applied by the worm wheel 27 (see FIG. 1).

The clearance S will now be described. As shown in FIGS. 9 and 10A, the clutch 90 is formed such that, in the driving-side rotor 91, the distal end face of the driven-side coupling portion 72 and the distal end face of the coupling portion 7a of the rotary shaft 7 press fitted in the drive shaft insertion hole 42 contact each other in the axial direction. On the other hand, to smoothly transmit rotational driving force from the worm portion 24a to the worm wheel 27 while suppressing deformation of the worm shaft 24, which has the worm portion 24a meshing with the worm wheel 27, the motor allows the worm shaft 24 formed integrally with the driven-side coupling portion 72 to move slightly in the axial direction. Therefore, in the motor having the clutch 90, when a force that moves the worm shaft 24 away from the rotary shaft 7 is applied to the worm portion 24a from the worm wheel 27, the worm shaft 24 is slightly moved in the axial direction away from the rotary shaft 7. This creates a slight clearance S between the driven-side coupling portion 72 and the coupling portion 7a.

As shown in FIGS. 10A and 11, each second buffer member 92 is formed integrally with and connected to the buffer member 45 and the elastic member 46 that are adjacent to the second buffer member 92 in the axial direction. Specifically, each second buffer member 92 are connected to ends in the axial direction of the buffer member 45 and the elastic member 46 that are adjacent in the axial direction to the second buffer member 92. Each second buffer member 92 is molded integrally with a part of the driving-side rotor 91 that is made of resin. The second buffer members 92 are formed at the same time as when the buffer members 45, the elastic members 46, and the shock absorbing members 50 are formed.

Operation of the clutch 90 according to the second embodiment will now be described. Like the clutch 3 according to the first embodiment, the clutch 90 prevents rotation of the driven-side rotor 35 from being transmitted to the rotary shaft 7 when the rotary shaft 7 is not driven to rotate, and transmits rotational driving force to the driven-side rotor 35 when the rotary shaft 7 is driven to rotate.

With reference to FIG. 9, in the motor according to the present embodiment, when the motor section 1 is in a stopped state, that is, when the rotary shaft 7 and the driven-side rotor 91 are not driven to rotate, the worm shaft 24 is pushed in a direction away from the rotary shaft 7 by the worm wheel 27. Therefore, as shown in FIG. 10A, the clearance S is created between the distal end face of the driven-side coupling portion 72 and the distal end face of the coupling portion 7a. The driven-side rotor 35 and the worm shaft 24 are pushed in a direction away from the rotary shaft 7 by the second buffer members 92, which contact the distal end face of the driven-side coupling portion 72.

When the motor section 1 is activated, the output shaft 28 and the worm wheel 27 receive load that acts in a direction opposite to the direction of a force that acts to rotate the worm wheel 27 when the motor 1 is stopped. At the beginning of driven rotation of the rotary shaft 7, the resistance applied to the worm portion 24a by the worm wheel 27 moves the driven-side rotor 35 and the worm shaft 24 toward the rotary shaft 7. At this time, the driven-side rotor 35 and the worm shaft 24 are moved slowly toward the rotary shaft 7 while deforming the second buffer members 92 between the driven-side coupling portion 72 and the drive shaft coupling portion 41. Therefore, the impact produced when the coupling portion 7a of the rotary shaft 7 contacts the driven-side coupling portion 72 is absorbed by the second buffer members 92. This allows the coupling portion 7a and the driven-side coupling portion 72 to contact softly.

In addition to the advantages (1) to (14) of the first embodiment, the second embodiment has the following advantages.

(15) The impact produced when the coupling portion 7a of the rotary shaft 7 contacts the driven-side coupling portion 72 is absorbed by the second buffer members 92. This reduces noise produced when the coupling portion 7a contacts the driven-side coupling portion 72.

(16) The second buffer members 92 are formed about the opening 42d. Therefore, noise produced when the rotary shaft 7 contacts the driven-side coupling portion 72 is suppressed while allowing the rotary shaft 7 and the driven-side coupling portion 72 to contact each other.

(17) Each second buffer member 92 is formed integrally with and connected to the buffer member 45 and the elastic member 46 that are adjacent to the second buffer member 92 in the axial direction. Therefore, the second buffer members 92 can be formed at the same time as when the buffer members 45 and the elastic members 46 are formed.

The preferred embodiments of the present invention may be modified as follows.

In each of the above embodiments, the clutch 3, 90 is provided in a motor and located between the rotary shaft 7 and the worm shaft 24, which are also provided in the motor. However, the clutches 3, 90 may be provided in any device other than motors, as long as the clutches 3, 90 are arranged between a drive shaft and a driven shaft, which are coaxially arranged, and the clutches 3, 90 transmit rotational driving force from the drive shaft to the driven shaft, while preventing rotational force from being transmitted from the driven shaft to the drive shaft.

In the above second embodiment, the protruding amount in the axial direction of each second buffer member 92 from the end face 41a of the drive shaft coupling portion 41 is slightly greater than or equal to the width W of the clearance S. However, the protruding amount may be less than the clearance S.

The positions and shape of the second buffer members 92 are not restricted to those shown in the second embodiment. The positions and shape of the second buffer members 92 may be changed as long as the distal end face of the driven-side coupling portion 72 can contact the second buffer members 92 in the axial direction in the driving-side rotor 91. For example, a single annular second buffer member 92 may be formed so as to surround the opening 42d of the drive shaft insertion hole 42. Also, multiple second buffer members 92 may be formed about the drive shaft insertion hole 42 so as to be intermittent along the circumferential direction.

In the second embodiment, the second buffer members 92 are formed only on the driving-side rotor 91. However, the second buffer members 92 may be formed on the distal end face of the driven-side coupling portion 72 so as to be contactable with the end face 41a in the axial direction of the drive shaft coupling portion 41. The second buffer members 92 may be formed on the distal end faces of both the driving-side rotor 91 and the driven-side coupling portion 72.

In the second embodiment, each second buffer member 92 is formed integrally with and connected to the buffer member 45 and the elastic member 46 that are adjacent to the second buffer member 92 in the axial direction. However, the second buffer members 92 do not necessary need to be integrally formed with the buffer members 45 and the elastic members 46.

Figure 10B:
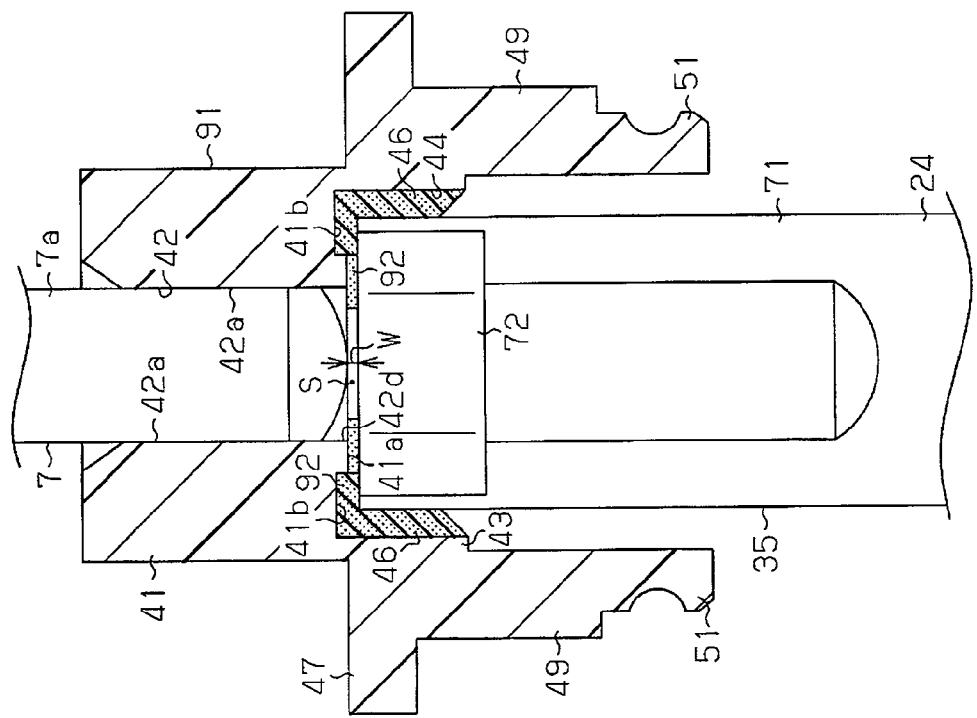
FIG. 10B is a partially enlarged view of a clutch according to a modification.

In the second embodiment, the worm shaft 24 is pushed in a direction away from the rotary shaft 7 by the worm wheel 27 when the motor section 1 is not operating. However, when the motor section 1 is not operating, the worm shaft 24 may be pushed toward the rotary shaft 7 by the worm wheel 27. Accordingly, when the motor section 1 is not operating, the driven-side rotor 35 and the worm shaft 24 are moved toward the rotary shaft 7 while deforming the second buffer members 92 between the driven-side coupling portion 72 and the drive shaft coupling portion 41 as shown in FIG. 10B. Therefore, when the motor section 1 is not operating, the coupling portion 7a contacts the driven-side coupling portion 72. When the motor section 1 is driven, the force applied by the worm wheel 27 moves the driven-side rotor 35 and the worm shaft 24 away from the rotary shaft 7 in accordance with the rotational direction of the rotary shaft 7. Thereafter, when the motor section 1 is stopped, the driven-side rotor 35 and the worm shaft 24 are pushed and moved toward the rotary shaft 7 by the worm wheel 27. At this time, the driven-side rotor 35 and the worm shaft 24 are moved slowly toward the rotary shaft 7 while deforming the second buffer members 92 between the driven-side coupling portion 72 and the drive shaft coupling portion 41. Therefore, the impact produced when the coupling portion 7a contacts the driven-side coupling portion 72 is absorbed by the second buffer members 92. This allows the coupling portion 7a and the driven-side coupling portion 72 to contact softly. Thus, the same advantage as the advantage (15) of the first embodiment is obtained.

In the above embodiments, the flat surfaces 42a of the drive shaft insertion hole 42 and the driving-side transmission surfaces 44a of the driven shaft insertion hole 44 are displaced by 90° about the central axis of the driving-side rotor 32 or 91. However, the flat surfaces 42a and the driving-side transmission surfaces 44a may be displaced by an angle other than 90°. Also, the flat surfaces 42a and the driving-side transmission surfaces 44a may be formed to be parallel with each other.

The shape of the drive shaft insertion hole 42 is not limited to that in the above embodiments. The drive shaft insertion hole 42 may have any shape as long as it couples the rotary shaft 7 and the driving-side rotor 32 or 91 to each other, so that these are integrally rotatable. That is, the rotary shaft 7 does not necessarily need to be press fitted in the drive shaft insertion hole 42, as long as the rotary shaft 7 is inserted (for example, press fitted or loosely fitted) in the drive shaft insertion hole 42 such that the driving-side rotor 32 or 91 is coupled to and integrally rotatable with the rotary shaft 7. The shape of the driven shaft insertion hole 44 is not limited to that in the above embodiments. The driven shaft insertion hole 44 may have any shape as long as it couples the driving-side rotor 32 or 91 and the driven-side rotor 35 to each other, so that these are integrally rotatable. That is, the driven-side rotor 35 may be inserted (for example, press fitted or loosely fitted) in the driven shaft insertion hole 44 in any manner as long as the driving-side rotor 32 or 91 is coupled to and integrally rotatable with the driven-side rotor 35.

In the driving-side rotor 32, the drive shaft insertion hole 42 and the driven shaft insertion hole 44 do not necessarily need to be continuous in the axial direction. Also, the driven-side coupling portion 72 inserted in the driven shaft insertion hole 44 does not necessarily need to contact the coupling portion 7a of the rotary shaft 7 inserted in the drive shaft insertion hole 42 in the axial direction.

In the first embodiment, the driving-side engaging portions 51 are formed integrally with the rolling element releasing portions 49. However, the driving-side engaging portions 51 may be formed integrally at a position away from the rolling element releasing portions 49 in the driving-side rotor 32. Also, an engaging portion may be provided as a part separate from the driving-side rotor 32 and the support member 33, which part allows the driving-side rotor 32 and the support member 33 to rotate relative to each other about the central axis of the driving-side rotor 32, while engaging the driving-side rotor 32 and the support member 33 with each other with respect to the axial direction. The clutch 3 does not necessarily have engaging portions (the driving-side engaging portions 51 and the supporting-side engaging portions 68). The same applies to the clutch 90 according to the second embodiment.

The clutches 3, 90 do not necessarily need to have the support members 33.

In the embodiments, the brim portion 47 of the driving-side rotor 32, 91 has the check windows 48. However, the brim portion 47 does not necessarily need to have the check windows 48.

In the above embodiments, the driving-side rotors 32, 91 has the annular brim portion 47 serving as a contact portion that contacts the support members 33 along the axial direction. However, the contact portion does not necessarily need to have an annular shape as long as it can prevent the support members 33, which contact the contact portion along the axial direction, from moving further toward the driving side (toward the motor section 1). For example, the brim portion 47 may be replaced by a rod-like contact portion extending radially outward from the driving-side rotor 32, 91. Also, the driving-side rotor 32, 91 does not necessarily need to have the brim portion 47.

In the above embodiments, the driven-side coupling portion 72 is loosely fitted in and overlaps with the driving-side rotor 32, 91 in the axial direction, so that the driven-side coupling portion 72 is integrally rotatable with the driving-side rotor 32, 91. Also, the elastic members 46 are placed between parts of the driving-side rotor 32, 91 and the driven-side coupling portion 72 that face each other in the radial direction. However, the elastic members 46 may be removed from the driving-side rotor 32, 91, and the driven-side coupling portion 72 may be inserted in the driven shaft insertion hole 44.

In the first embodiment, the driven-side coupling portion 72 of the driven-side rotor 35 is inserted in the driven shaft insertion hole 44 of the driving-side rotor 32, so that the driving-side rotor 32 is coupled to and integrally rotatable with the driven-side rotor 35. However, the mechanism for coupling the driving-side rotor 32 and the driven-side rotor 35 to each other to be integrally rotatable is not limited to that described in the embodiment. For example, an insertion recess may be formed in the driven-side coupling portion 72, and the pillar-like driving-side coupling portion 43 may be inserted in the insertion recess, so that the driving-side rotor 32 and the driven-side rotor 35 are integrally rotatable. In this case, the pillar-like driving-side coupling portion 43 may be loosely fitted in the insertion recess of the driven-side coupling portion 72 with the elastic members 46 disposed between parts of the driving-side rotor 32 and the driven-side coupling portion 72 that face each other in the radial direction. In this manner, the same advantage as the advantage (5) of the first embodiment is obtained.

The driving-side rotor 32, 91 does not necessarily need to have the buffer members 45.

In the above embodiments, when the driving-side rotor 32, 91 is driven to rotate, the driving-side transmission surfaces 44a contact either the first driven-side transmission surfaces 74 or the second driven-side transmission surfaces 75 of the driven-side coupling portion 72 in the rotational direction. However, parts of the driving-side rotor 32, 91 and the driven-side coupling portion 72 that contact each other when the driving-side rotor 32, 91 is driven to rotate do not necessarily need to be flat surfaces.

In the above embodiments, the driven-side coupling portion 72 and the control surfaces 73 are formed continuously along the axial direction. However, the driven-side coupling portion 72 and the control surfaces 73 may be separated from each other along the axial direction as long as these are at different axial positions.

In the above embodiments, the clutch 3, 90 has two rolling elements 34. However, the clutch 3, 90 may have one or more than two rolling elements 34. In this case, the number of the control surfaces 73, the number of the rolling element supports 64 of the support members 33, the number of the rolling element releasing portions 49, and the number of the check windows 48 are changed in accordance with the number of the rolling elements 34.

The rolling elements 34 have a columnar shape in the above embodiments. However, the rolling elements 34 do not necessarily need to have a columnar shape. For example, the rolling elements 34 may be spherical.

In the above embodiments, the driving-side rotor 32, 91 is formed separately from the rotary shaft 7. However, the driving-side rotor 32, 91 may be formed integrally with the rotary shaft 7. Also, the driven-side rotor 35 is formed integrally with the worm shaft 24 in the above embodiments. However, the driven-side rotor 35 may be formed separately from and integrally rotatable with the worm shaft 24.

What is claimed is:

1. A clutch comprising:
an annular clutch housing;
a driving-side rotor;
a driven-side rotor having a control surface, the control surface facing radially outward in the clutch housing, wherein, when the driving-side rotor rotates, the rotational driving force of the driving-side rotor is transmitted to the driven-side rotor; and
a rolling element arranged between the inner circumferential surface of the clutch housing and the control surface, wherein, when the driving-side rotor is driven to rotate, the rolling element rotates together with the driving-side rotor, and when the driving-side rotor is not driven to rotate, the rolling element is held between the inner circumferential surface of the clutch housing and the control surface so as to prevent the driven-side rotor from rotating,
wherein the driven-side rotor includes a driven-side coupling portion that can be coupled to and integrally rotated with the driving-side rotor, and the driven-side coupling portion and the control surface are provided at different positions in the axial direction.

2. The clutch according to claim 1, wherein the driven-side coupling portion and the control surface are continuous in the axial direction.

3. The clutch according to claim 1, wherein the driving-side rotor has a driving-side transmission surface, the driven-side coupling portion has a driven-side transmission surface, and the driving-side transmission surface contacts the driven-side transmission surface in the rotational direction of the driving-side rotor when the driving-side rotor is driven to rotate.

4. The clutch according to claim 3, wherein a buffer member is provided on at least one of the driving-side transmission surface and the driven-side transmission surface, the buffer member absorbing impact generated when the driving-side transmission surface contacts the driven-side transmission surface.

5. The clutch according to claim 1, wherein
the driving-side rotor and the driven-side rotor are arranged coaxially, and
one of the driving-side rotor and the driven-side coupling portion is loosely fitted to the other so as to be integrally rotatable with and overlap in the axial direction with the other,
the clutch further comprising an elastic member provided between parts of the driving-side rotor and the driven side coupling portion that face each other in the radial direction.

6. The clutch according to claim 1, wherein
the rolling element is one of a plurality of rolling elements,
the clutch further comprises a support member for supporting the rolling elements,
the driving-side rotor has a contact portion that is contactable with the support member in the axial direction.

7. The clutch according to claim 6, wherein the driving-side rotor further includes a brim portion that extends in a radial direction so as to cover an axial end of the support member that is closer to the driving-side rotor and the brim portion has a check window through which the rolling elements can be visibly checked.

8. The clutch according to claim 1, wherein
the rolling element is one of a plurality of rolling elements,
the clutch further comprises a support member for supporting the rolling elements, and
the driving-side rotor and the support member each have an engaging portion, the engaging portions being engaged with each other so as to restrict relative movement between the driving-side rotor and the support member in the axial direction and to allow the driving-side rotor and the support member to rotate relative to each other about a central axis of the driving-side rotor.

9. The clutch according to claim 8, wherein the driving-side rotor further includes a rolling element releasing portion that is formed integrally with the engaging portion of the driving-side rotor, and wherein, at the beginning of driven rotation of the driving-side rotor, the rolling element releasing portion pushes the rolling elements, thereby releasing the rolling elements from a state held by the inner circumferential surface of the clutch housing and the control surface.

10. The clutch according to claim 1, wherein
the driving-side rotor further includes a drive shaft insertion hole and a driven shaft insertion hole that is continuous to the drive shaft insertion hole in the axial direction, a drive shaft being insertable into the drive shaft insertion hole so as to be integrally rotatable with the driving-side rotor, and the driven-side coupling portion being insertable into the driven shaft insertion hole so as to be integrally rotatable with the driving-side rotor, and
the driven-side coupling portion inserted in the driven shaft insertion hole contacts the drive shaft inserted in the drive shaft insertion hole.

11. The clutch according to claim 10, wherein the drive shaft insertion hole and the driven shaft insertion hole each have a cylindrical inner circumferential surface, each inner circumferential surface including a pair of flat surfaces and a pair of coupling surfaces, the flat surfaces being separated from each other in the radial direction and parallel with each other, the coupling surfaces coupling the flat surfaces to each other, and the flat surfaces of the drive shaft insertion hole and the flat surfaces of the driven shaft insertion hole being displaced by 90° about the central axis of the driving-side rotor.

12. The clutch according to claim 10, wherein at least one of the driving-side rotor and the driven-side rotor has a second buffer member that absorbs impact generated when the drive shaft and the driven-side coupling portion contact each other.

13. The clutch according to claim 12, wherein the second buffer member is provided about the drive shaft insertion hole.

14. The clutch according to claim 1, wherein the control surface and the driven-side coupling portion are located at positions radially inward of an outer shape of a driven shaft that rotates integrally with the driven-side rotor.

15. A motor comprising:

a motor section having a drive shaft;

a speed reducing section that is arranged coaxially with the drive shaft and has a driven shaft, rotational driving force of the drive shaft being transmitted to the driven shaft, the speed reducing section reducing the transmitted rotational driving force and outputting the reduced rotational driving force; and the clutch according to claim 1 provided between the drive shaft and the driven shaft, wherein the driving-side rotor is provided to be integrally rotatable with the drive shaft and the driven-side rotor is provided to be integrally rotatable with the driven shaft.

16. The motor according to claim 15, wherein the control surface and the driven-side coupling portion are located at positions radially inward of an outer shape of the driven shaft.

* * * * *